(12) United States Patent
Inglehart

(10) Patent No.: US 11,703,170 B2
(45) Date of Patent: Jul. 18, 2023

(54) HIGH PRESSURE COMPOSITE PIPE JOINING SYSTEM

(71) Applicant: Varco I/P, Inc., Wilmington, DE (US)

(72) Inventor: Lamont Thomas Inglehart, San Antonio, TX (US)

(73) Assignee: VARCO I/P, INC., Wilmington, DE (US)

( * ) Notice: Subject to any disclaimer, the term of this patent is extended or adjusted under 35 U.S.C. 154(b) by 405 days.

(21) Appl. No.: 16/023,371

(22) Filed: Jun. 29, 2018

(65) Prior Publication Data

US 2020/0003343 A1    Jan. 2, 2020

(51) Int. Cl.
*F16L 37/14*    (2006.01)

(52) U.S. Cl.
CPC .................................. *F16L 37/148* (2013.01)

(58) Field of Classification Search
CPC ........ F16L 37/14; F16L 37/142; F16L 37/148
See application file for complete search history.

(56) References Cited

U.S. PATENT DOCUMENTS

| | | | |
|---|---|---|---|
| 170,473 A | 11/1875 | Flagler et al. | |
| 3,427,047 A | 2/1969 | Mayo | |
| 3,762,745 A * | 10/1973 | Cunningham | ........ E21B 17/042 285/92 |
| 4,220,359 A | 9/1980 | Evenson et al. | |
| 4,335,908 A | 6/1982 | Burge | |
| 5,096,231 A * | 3/1992 | Chisnell | .............. F16L 33/2076 285/55 |
| 5,558,375 A | 9/1996 | Newman | |
| 5,785,092 A | 7/1998 | Friedrich | |
| 6,325,424 B1 * | 12/2001 | Metcalfe | ............... F16L 37/148 285/305 |
| 6,460,900 B1 * | 10/2002 | Bakke | ................... E21B 17/046 285/330 |
| 8,910,979 B1 | 12/2014 | Fails et al. | |
| 10,760,719 B2 * | 9/2020 | Fahrer | ................... B29C 65/483 |
| 2002/0163191 A1 | 11/2002 | Muenster et al. | |
| 2004/0108119 A1 | 6/2004 | Maguire et al. | |
| 2007/0001454 A1 | 1/2007 | Baving et al. | |
| 2013/0140811 A1 | 6/2013 | Faghrer | |
| 2014/0182732 A1 | 7/2014 | Coogan et al. | |
| 2015/0204468 A1 | 7/2015 | Jones | |
| 2017/0102102 A1 | 4/2017 | Goble et al. | |

(Continued)

FOREIGN PATENT DOCUMENTS

| | | | | |
|---|---|---|---|---|
| CA | 1209614 A | * | 8/1986 | ............ F16L 13/141 |
| CA | 2420707 A1 | * | 12/2003 | ............ F16L 37/148 |
| DE | 202011109906 U1 | * | 8/2012 | ............... A47K 1/05 |

(Continued)

OTHER PUBLICATIONS https://www.twi-global.com/technical-knowledge/faqs/what-is-a-composite-pipe.*

(Continued)

*Primary Examiner* — James M Hewitt, II
(74) *Attorney, Agent, or Firm* — Schwegman Lundberg & Woessner, P.A.

(57) ABSTRACT

A pipe connection may include a female component with a sealing portion, a stoppage flare, and a first locking section and a male component with a nozzle configured for sealingly engaging the sealing portion, a stopping cone for abutting the stoppage flare, and a second locking section.

13 Claims, 5 Drawing Sheets

(56) References Cited

U.S. PATENT DOCUMENTS

2022/0316637 A1    10/2022   Granderson

FOREIGN PATENT DOCUMENTS

| DE | 202013103804 U1 | * | 11/2014 | ............ F16L 37/148 |
| DE | 202017005706 U1 | * | 3/2018 | ............. B63B 32/70 |
| EP | 1837581 A2 | | 9/2007 | |
| EP | 3173675 A1 | | 5/2017 | |
| FR | 2853042 A1 | | 10/2004 | |
| WO | WO-9013768 A1 | | 11/1990 | |
| WO | WO-2005061938 A1 | | 7/2005 | |
| WO | WO-2008062443 A2 | * | 5/2008 | ......... B29C 66/1222 |
| WO | WO-2020237199 A1 | | 11/2020 | |

OTHER PUBLICATIONS

"European Application Serial No. 19181638.8, Extended European Search Report dated Oct. 1, 2019", 7 pgs.

"European Application Serial No. 19181638.8, Response filed Sep. 9, 2019 to Office Action dated Jul. 10, 2019", 6 pgs.

"European Application Serial No. 19181638.8, Response filed Jun. 29, 2020 Extended European Search Report dated Oct. 1, 2019", 26 pgs.

"International Application Serial No. PCT/US2020/034352, International Search Report dated Sep. 21, 2020", 2 pgs.

"International Application Serial No. PCT/US2020/034352, Written Opinion dated Sep. 21, 2020", 8 pgs.

"Gulf Cooperation Council Application Serial No. 2019-37849, Examination Report dated Apr. 25, 2021", 5 pgs.

"International Application Serial No. PCT/US2020/034352, International Preliminary Report on Patentability dated May 18, 2021", 4 pgs.

"European Application Serial No. 19181638.8, Communication Pursuant to Article 94(3) EPC dated Dec. 21, 2021", 5 pgs.

"European Application Serial No. 19181638.8, Response filed Apr. 19, 2022 to Communication Pursuant to Article 94(3) EPC dated Dec. 21, 2021", 20 pgs.

* cited by examiner

HIGH PRESSURE COMPOSITE PIPE JOINING SYSTEM

TECHNOLOGICAL FIELD

The present disclosure relates to a system and method for splicing, coupling, or connecting piping, tubing, or other elongated elements with a longitudinal lumen. More particularly, the present disclosure relates to a system and method for connecting composite, concrete, or other relatively non-ductile piping. Still more particularly, the present disclosure relates to a system and method for connecting composite pipe sections while accommodating a wide range of relative pipe orientations, protecting seals, providing a clear indication of a completed connection, and allowing for a physically less demanding assembly.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Composite piping continues to become more prevalent for piping projects including underground water supply systems, petroleum or crude oil conveying systems and the like. Connections between segments of composite pipe have, historically, included a few different configurations. There have been screw-type connections 50, such as the one shown in FIG. 1, and bell-shaped locking key joints 60 such as the one shown in FIG. 2. The screw-type connections become tight and create a seal when they are screwed together to a point where the connection is tight. This can create problems when a particular orientation is desired or needed for one of the sections a pipe. In these situations, the pipe may need to be unthreaded or unscrewed to accommodate the desired orientation, but that may result in a loose or leaking joint. The bell-shaped locking key joint may better accommodate relative pipe orientation, but it has other issues. For example, the locking joints may create relatively sharp edges that may sever, mar, or damage the seal as the male portion is forced into the female bell portion. Still further, the openings for the locking pins may not be easily aligned with the locking key joints. Still further, the tendency for the seal to hang up on the locking key joints can make the connection physically difficult to pull together. This latter issue may cause the pipe to jump as it is assembled, which may further exacerbate the issue of alignment of the openings for the locking pins with the locking key joints. Still other problems exist in the prior art.

Among the several issues associated with the design of composite piping systems is the problem associated with managing the high pressures sometimes present in the piping systems. Internal pressures within a pipe create stresses in the pipe wall that are directly related to the pipe diameter. Accordingly, as the pipe diameter increases, the stresses in the pipe wall increase. Where a connection is formed using a female portion in the form of a bell-shaped pipe, and a male portion inserted into the bell, the stresses in the bell or the neck of the bell can become significantly high. For example, in the area 62 shown in FIG. 2, the wall stresses in the female portion of the pipe can increase significantly. It is to be appreciated that for purposes of flow of fluid through the pipe system and avoiding bottle necks at the connection, the design of the connection may require that the internal pipe area be maintained at the connection. Where the connection involves a female belled end and a male end, the female belled end naturally has an increased diameter to receive the male end where the belled end accommodates the internal pipe diameter, and the wall thickness of male end. The increase in pipe wall stresses at the connection can be difficult to manage for these reasons.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a pipe connection may include a female component with a sealing portion, a stoppage flare, and a first locking section. The pipe connection may also include a male component with a nozzle configured for sealingly engaging the sealing portion, a stopping cone for abutting the stoppage flare, and a second locking section.

In one or more embodiments, a pipe may include a female component arranged at an end of the pipe and configured for receiving a male component. The female component may include a sealing portion configured for sealing engagement of a nozzle of a male component. The female component may also include a stoppage flare arranged distally from the sealing portion and configured for arresting further advancement of a male component into the female component. The female component may also include a locking section configured for securing a male component within a female component.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to a high-pressure pipe joining or connection system that allows for freedom relating to the relative orientation of connected elements. The system may also allow for ease of insertion in addition to ease of alignment of the key openings. As such, the presently disclosed system may solve one or more of the several problems found in the prior art systems, particularly as it relates to high-pressure composite pipe joining systems. In particular, the presently disclosed system may be particularly useful with fiber reinforced composite pipe systems and may allow for pressures exceeding 200 bar.

Figure 1:
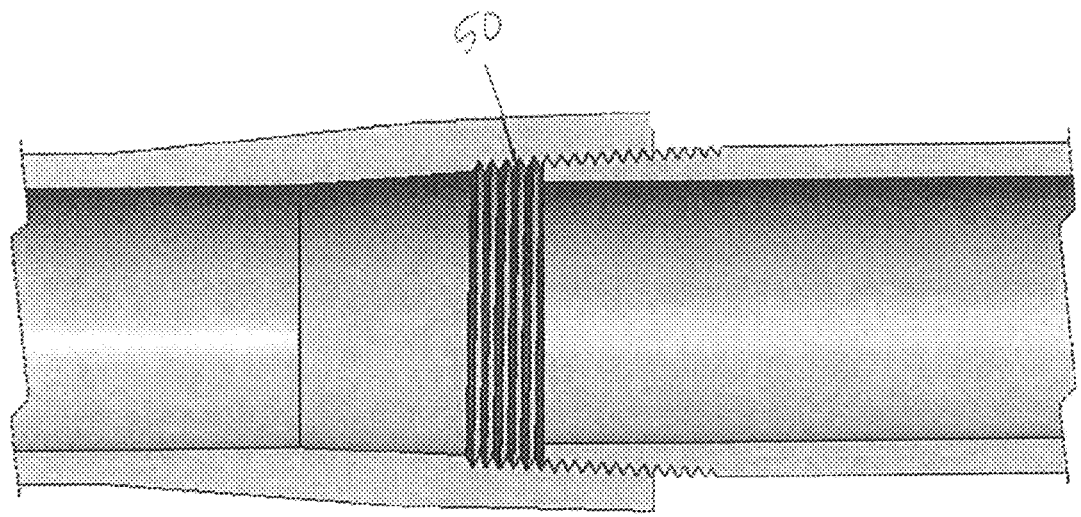
FIG. 1 is a cross-sectional side view of a female component of a pipe connection including a side view of a male component of the connection arranged therein.
Figure 2:
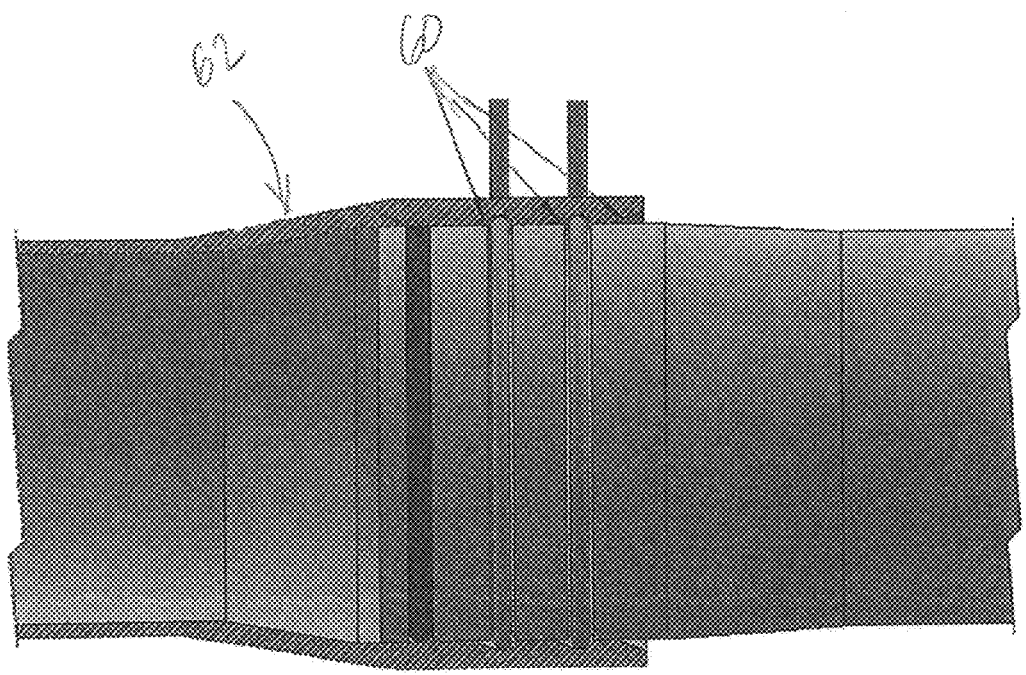
FIG. 2 is a side view of a pipe connection with the female component of the connection shown in cross-section.
Figure 3:
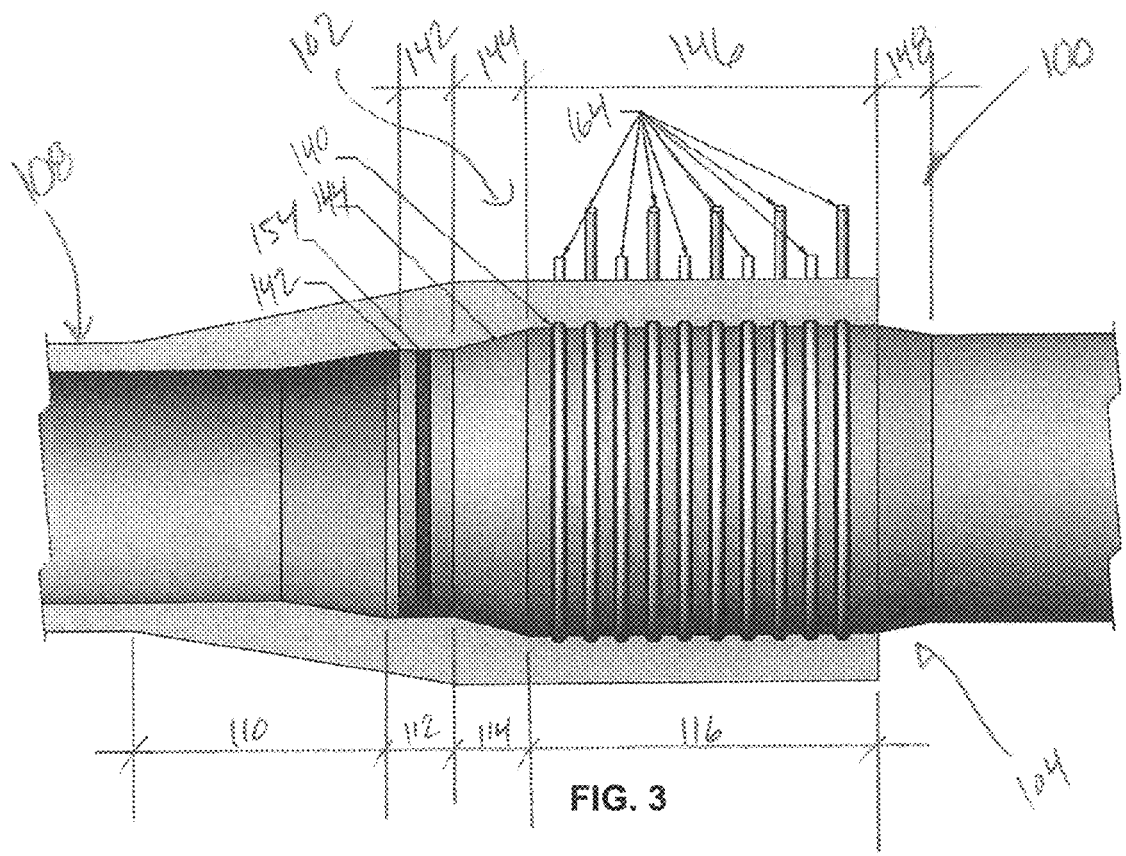
FIG. 3 is a side view of a pipe connection with the female component of the connection shown in cross-section, according to one or more embodiments.

FIG. 3 shows a side view of a pipe connection 100, according to one or more embodiments. The figure includes a side view of a male component 104 of the connection and a cross-section view of a female component 102 of the connection revealing how the male component 104 fits within the female component 102. It is to be appreciated that two connecting ends of a pipe section 108 are shown and that pipe sections may be formed with a female end and a male end, two female ends, or with two male ends. The pipe connection 100 shown may be well suited for use with composite piping and, in particular, high-pressure composite piping. The pipe connection shown may be configured to allow for any rotational orientation of one pipe relative to the other. The connection may be assembled without damaging a seal and may allow for physical ease of assembly and a mechanism for controlling alignment of connection locking mechanisms. As mentioned, the connection may include a female component and a male component configured for providing the above-listed advantages.

Figure 5:
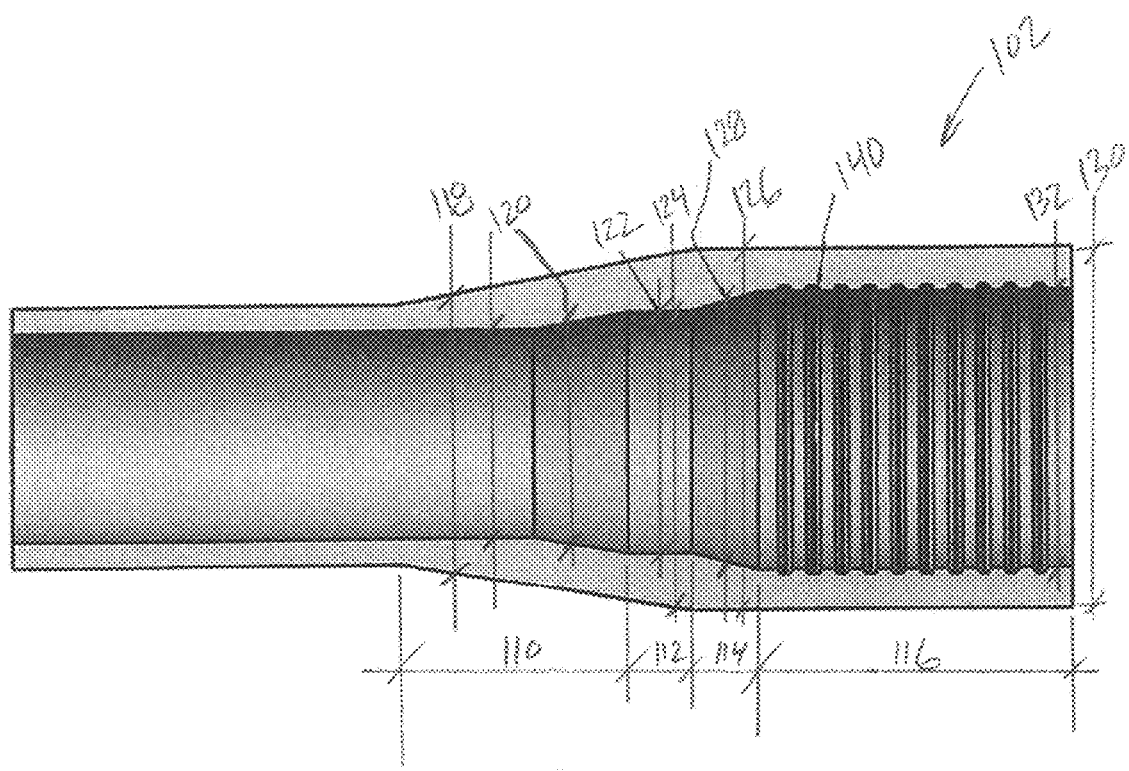
FIG. 5 is a cross-sectional view of a female component of the pipe connection of FIG. 3, according to one or more embodiments.

Referring to FIGS. 3 and 5, the female component 102 may be configured for receiving the male component 104. In addition, the female component 102 may include features that cooperate with corresponding features on the male component that function to control the relative longitudinal position of the components, allow for ease of insertion of the male component, seal the connection, and secure the connection. The features may also allow for freedom of relative orientation about a longitudinal axis. The female component 102 may include a neck portion 110, a sealing portion 112, a stoppage flare 114, and a locking section 116. Each of these portions are described in detail in the following discussion, but as shown in FIGS. 3 and 5, the portions may be arranged in sequence extending from the plain portion of the pipe section. That is, the neck portion 110 may extend from the plain portion and may lead to the sealing collar 112, which may lead to the stoppage flare 114 and then the locking section 116.

As shown in FIGS. 3 and 5, the neck portion 110 of the female component 102 may include a transitional portion configured to increase the inner diameter of the pipe to accommodate a nozzle portion of the male component which is described in more detail below. The transition portion may also be configured to develop an increased wall thickness to accommodate the larger inner diameter and the associated higher wall forces. The transitional portion may include an outer diameter 118 that is larger than the outer diameter of the pipe section and that is increasing as the transitional portion extends toward the end of the female component. The transitional portion may contribute to a bell-shaped outer surface of the female end of the pipe section. The transitional portion may include an inner diameter 120 that is larger than the inner diameter of the pipe section and that is increasing as the transitional portion extends toward the sealing collar. The transitional portion's inner diameter may increase to accommodate the nozzle of the male portion while maintaining an inner flow diameter. As such, the transitional portion's inner diameter at a distal end may be selected to maintain the pipe flow diameter while accommodating the wall thickness of the nozzle portion of the male component. As shown, the increasing outer diameter may begin at a distance further in from the end of the pipe than the location of the increasing inner diameter. The relative position of where the increasing diameters begin may provide for an increased wall thickness.

The sealing portion 112 of the female component may be configured to receive the nozzle portion of the male component and provide a sealing surface for sealing with the nozzle portion. As shown, the sealing portion 112 may extend from the transitional portion for a distance slightly longer than the nozzle portion. The slightly longer length of the sealing portion may ensure that the male portion does not bottom out against the transitional portion before alignment of the locking features is attained. The sealing portion may include a constant inner diameter 122 and may include an increasing outer diameter 124 that may allow for a linear continuation of transitional portion on an outside surface of the female component. The inner diameter may be selected to receive the nozzle and may be equal to the inner diameter of the transitional portion at its distal end. The inner surface of the sealing portion may be relatively smooth and may provide a sealing surface for a gasket, O-ring, or other seal arranged on the nozzle of the male portion. The constant inner diameter through the sealing portion and the increasing outer diameter may create an increasing wall thickness in a direction extending toward the end of the pipe section.

The stoppage flare 114 of the female component may be configured to abut the stopping cone on the male component and provide a stop point for the connection. The stoppage flare may include a relatively constant outer diameter 126 and may include an inner diameter 128 that increases from the sealing portion to the locking portion. The increasing diameter may provide a cone-shaped inner surface that may act to abut the stopping cone on the male component. The interface of the stoppage flare on the female component with the stopping cone on the male component may provide a clear indication of full engagement of the connecting components. Moreover, the stoppage flare and the stopping cone may each be positioned to cause alignment of the locking features of the connection. The combination of an increasing inner diameter and a constant outer diameter may create a decreasing wall thickness in a direction extending toward the end of the pipe section.

The locking section 116 may be configured to allow the female component and the male component to be secured to one another to prevent dislodging of the male component from the female component. As shown in FIGS. 3 and 5, the locking section may include a substantially constant outer diameter 130 equal to the outer diameter of the stoppage flare portion and equal to the largest diameter of the sealing portion. The locking section may also have a substantially constant inner diameter 132 equal to the largest diameter of the stoppage flare. The outer diameter and the inner diameter may define a substantially constant wall thickness. The locking section may have a length that may be selected to be relatively long to accommodate a series of locking features.

Figure 4:
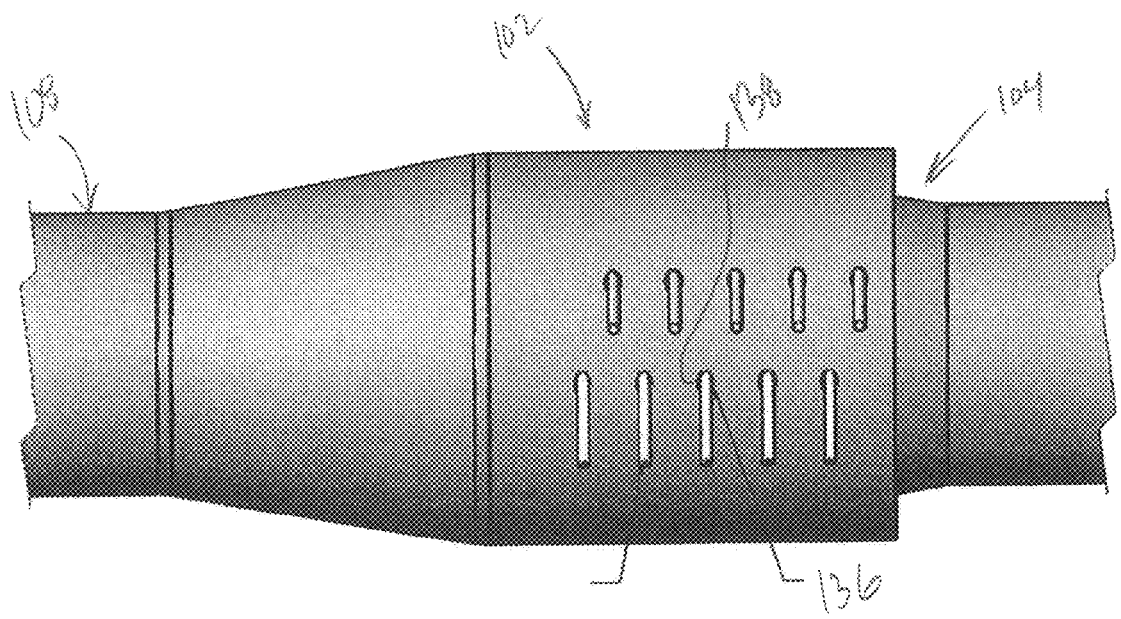
FIG. 4 is a side view of the pipe connection of FIG. 3, according to one or more embodiments.

As shown in FIG. 4, the locking features 134 may include a series of staggered holes 136 on the outer surface of the locking section 116. Each of the holes may lead to a bore 138 extending through the wall thickness of the locking section and leading to the inner surface. In one or more embodiments, the bore may extend along a relatively straight axis where the axis is substantially tangential to the inner surface of the locking section. In other embodiments, the bore 138 may extend at alternative angles relative to the inner surface. As the bore 138 extends through the wall thickness, the bore may end at a hole in the inner surface. The inner surface may include a groove, channel, or trough 140 in alignment with the bore 138 and extending fully or partially around the inner surface of the locking section. The groove, channel, or trough 140 may be substantially perpendicular to the axis of the pipe section forming a circle. Alternatively, one or more of the grooves, channels, or troughs may be spirally shaped, for example. The bores 138 may be adapted to receive a substantially round rod or bar and may have a substantially circular cross-section. The groove may also be adapted to receive a substantially round rod or bar and may have a substantially semi-circular cross-section. In other embodiments, square, triangular, or other shaped bars or locking elements may be used and the holes, bores, and grooves may be shaped to accommodate those shapes. In still other embodiments, the holes, bores, or grooves may have shaped that do not match the shape of the bar being inserted so as to increase the friction or the bite of the bar as it enters and is secured in position.

In one or more embodiments, the locking section 116 may include 10 staggered holes and corresponding bores and grooves where a row of 5 holes is staggered with another row of 5 holes. Still other numbers of holes, bores, and grooves may be provided depending on the size of the pipe, the pressures within the pipe, and the conditions anticipated. For example, in one or more other embodiments, 12, 14, 16, 18, or 20 holes/bores/grooves may be provided. In still other embodiments, 2, 4, 6, or 8 holes/bores/grooves may be provided. In still other embodiments, odd numbers similar to the ranges mentioned may be provided. Still other numbers of holes/bores/grooves may be provided. As shown, the grooves 140 on the inside surface of the locking section may be substantially equally spaced to align with the holes and bores. The spacing between the grooves may be substantially ½ the longitudinal spacing of the holes in a particular row such that holes spaced a distance X in each row causes grooves to be spaced a distance X/2 along the length of the locking section. In one or more embodiments, the grooves on the locking sections may avoid the use of gasket compression ramps because the relatively small diameter nozzle may allow for the male component to be inserted into the female component without interference with the gasket or O-ring until the nozzle enters the sealing portion of the female component. Current groove spacings where the grooves include compression ramps may be on the order of 4 to 5 times the width of the ductile key or its corresponding groove. By omitting the gasket compression ramps, the spacings of the grooves may be on the order of 2½ times the key or groove width allowing for shorter locking sections than previously used or contemplated. In one or more embodiments, the ratio of the composite width to the key width may be optimized by matching the shear performance between the composite and the selected key material. The circumferential spacing of the rows of holes may be spaced a distance similar to the spacing of the holes in a row.

Figure 6:
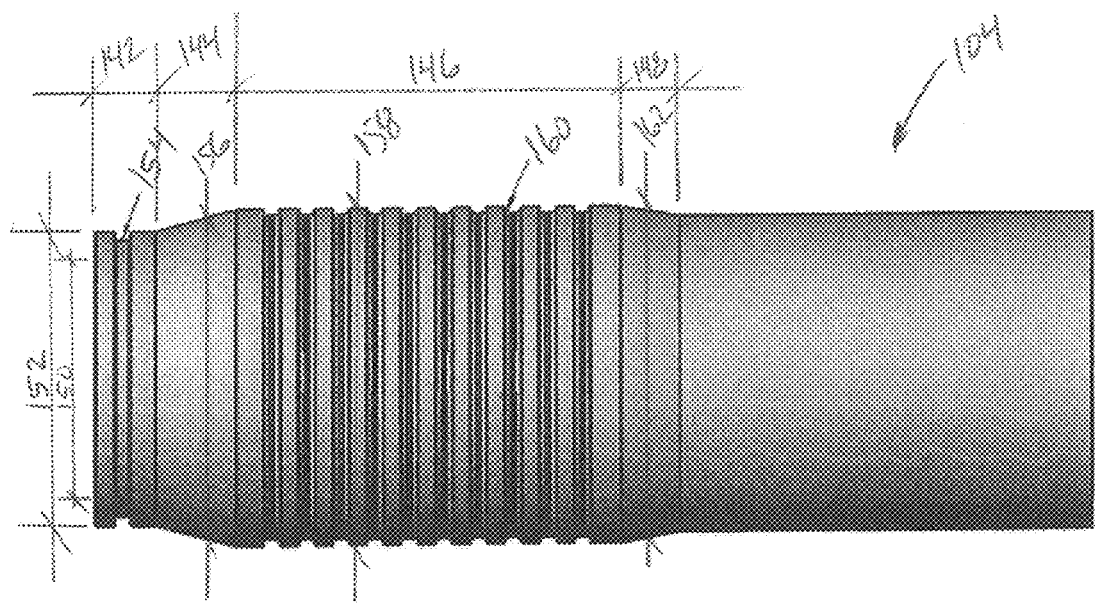
FIG. 6 is side view of a male component of the pipe connection of FIG. 3, according to one or more embodiments.

With continued reference to FIG. 3 and with reference to FIG. 6, the male component may be configured for insertion into the female component. In addition, the male portion may include features that cooperate with corresponding features on the female component that function to control the relative longitudinal position of the components, allow for ease of insertion of the male component, seal the connection, and secure the connection. The features may also allow for freedom of relative orientation about a longitudinal axis. The male component may include a nozzle portion 142, a stopping cone 144, a locking section 146, and a taper portion 148. Each of these portions are described in detail in the following discussion, but as shown in FIGS. 3 and 6, the portions may be arranged in sequence extending from the plain portion of the pipe section. That is, the taper portion may extend from the plain portion and may lead to the locking section, which may lead to the stopping cone, and then the nozzle portion.

As shown in FIGS. 3 and 6, the nozzle portion 142 may be arranged on an outer most end of a pipe section. The nozzle portion 142 may include a substantially constant inner diameter 150 that is substantially the same as the inner diameter of the pipe section. The outer diameter 152 may also be substantially constant and may be substantially the same as the outer diameter of the pipe section. In one or more embodiments, the outer diameter of the nozzle may be slightly smaller or slightly larger than the outer diameter of the pipe section. In any case, the inner diameter and outer diameter may define a nozzle wall thickness. The nozzle may also include a groove, channel, or trough 154 on an outside surface thereof. The groove 154 may be a substantially circular groove arranged substantially perpendicular to a longitudinal axis of the pipe section and the groove may be substantially centered along the length of the nozzle. The groove 154 may be adapted to receive a gasket or O-ring or other sealing element and may have a cross-section matching the cross-section of the gasket or O-ring, for example. As such, the cross-section of the groove 154 may be semi-circular, v-shaped, square, rectangular, or another shape may be provided. The nozzle 142 may include a single groove for a single gasket or O-ring as shown, or multiple grooves may be provided. The nozzle 142 may have a length somewhat shorter than the length of the sealing portion of the female component. Alternatively, the nozzle may have a length equal to or longer than the sealing portion. In one or more embodiments, the distance from the groove to the proximal end of the nozzle may be greater than the width of the key grooves in the locking section such that unseating of the nozzle seal would occur only after the keys/rods sheared completely in half.

The stopping cone portion 144 is also shown in FIGS. 3 and 6. The stopping cone portion 144 of the male component may be configured to abut the stoppage flare 114 of the female component to arrest inward travel of the male component relative to the female component. The stopping cone portion 144 may have a varying outside diameter 156 where the outside diameter is the same as the outside diameter of the nozzle at a distal side of the stopping cone portion and the outside diameter increases to a larger diameter at the locking section of the male component. The increasing diameter may create a linear cone-shaped surface that may substantially match or be slightly smaller than the cone-shaped surface of the stoppage flare 114 of the female component. The stopping cone portion may include an inner diameter that is the same as or equal to the inner diameter of the nozzle. Alternatively, the stopping cone portion may have a different internal diameter.

The locking section 146 of the male component may be configured to allow the female component and the male component to be secured to one another to prevent dislodging of the male component from the female component. As shown in FIGS. 3 and 6, the locking section may include a substantially constant outer diameter 158 equal to the largest diameter of the stopping cone portion 144. The locking section may also have a substantially constant inner diameter equal to the inner diameter of the nozzle and the stopping cone portion. The outer diameter and the inner diameter may define a substantially constant wall thickness. The locking section may have a length that may be selected to be relatively long to accommodate a series of locking features.

The locking section 146 of the male component may include a series of locking features in the form of grooves 160 on an outer surface thereof. The grooves 160 may correspond in spacing and location to the grooves on the inner surface of the locking section of the female component. The grooves 160 may be substantially circular extending around the circumference of the locking section of the male component. The grooves 160 may be arranged substantially perpendicular to the longitudinal axis of the pipe section. Alternatively, the grooves may be spirally arranged to match a spirally arranged groove o female component. As with the grooves on the female component, the size and cross-sectional shaped of the grooves may be selected to accommodate the shape of a rod to be inserted into the holes/bores of the female component. When the male component is inserted in the female component, the grooves of the respective locking sections may align with one another to extend the bores through the female component circumferentially around the locking section of the male component. The thickness of the female locking section may be the same or similar to the thickness of the locking section of the male component.

The size of the locking section of the male component, and the resulting size of the female locking section may be determined by engineering design giving consideration to design flow areas, material properties, internal pressures, and the like. In one or more embodiments, the locking section of the male component may have an inner diameter equal to the inner diameter of the pipe section and the wall thickness at the root of the key groove may be equal to or greater than the pipe wall thickness. The overall thickness of the locking section of the male component may then be equal to or greater than the pipe wall thickness plus ½ the locking key size/thickness. The outer diameter of the locking section of the male component may be equal to the inner pipe diameter plus two times the locking section thickness. The inner diameter of the locking section of the female component may be substantially equal to or slightly larger than the outer diameter of the locking section of the male component.

The taper portion 148 may be configured to transition from the locking section diameter to the plain pipe section diameter. As such, the taper portion may include an outer diameter 162 at the locking section equal to the locking section outer diameter and the outer diameter 162 may decrease along a direction moving away from the locking section to a diameter equal to the outside diameter of the pipe section. The length of the taper portion may be relatively short providing for a relatively short conical outer surface of the pipe that may extend from the female component when the male component is arranged therein. The taper portion may have a substantially constant inner diameter that may be the same or similar to the inner diameter of the other portions of the male component.

The connection may be secured with one or more rods 164 by inserting them and forcing them into the bores 138 in the locking sections. The rods may include malleable materials such as steel, stainless steel, metal alloys, plastics, or other materials. In one or more embodiments, nylon 6/6 may be used. Still other materials may also be used. In one or more embodiments, the rods may include a rounded or tapered tip allowing them to more smoothly advance through the bores. In one or more embodiments, the rods may have a cross-sectional dimension (i.e., diameter or other dimension) of approximately ⅜, ½, ¾, or 1 inch, for example. Still other sized bars may be provided.

Figure 7:
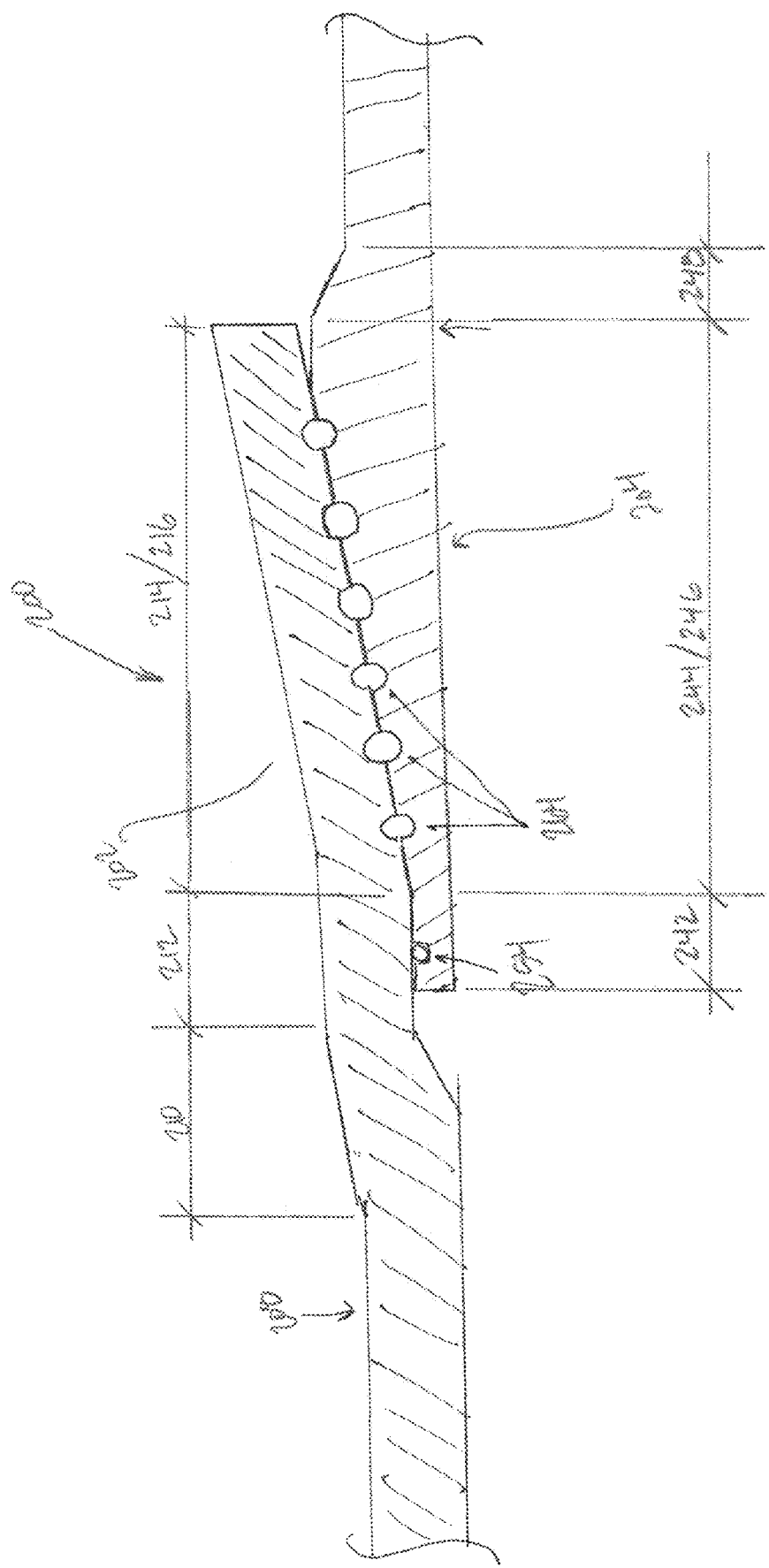
FIG. 7 is a partial cross-sectional view of a pipe connection, according to one or more embodiments.
Figure 8:
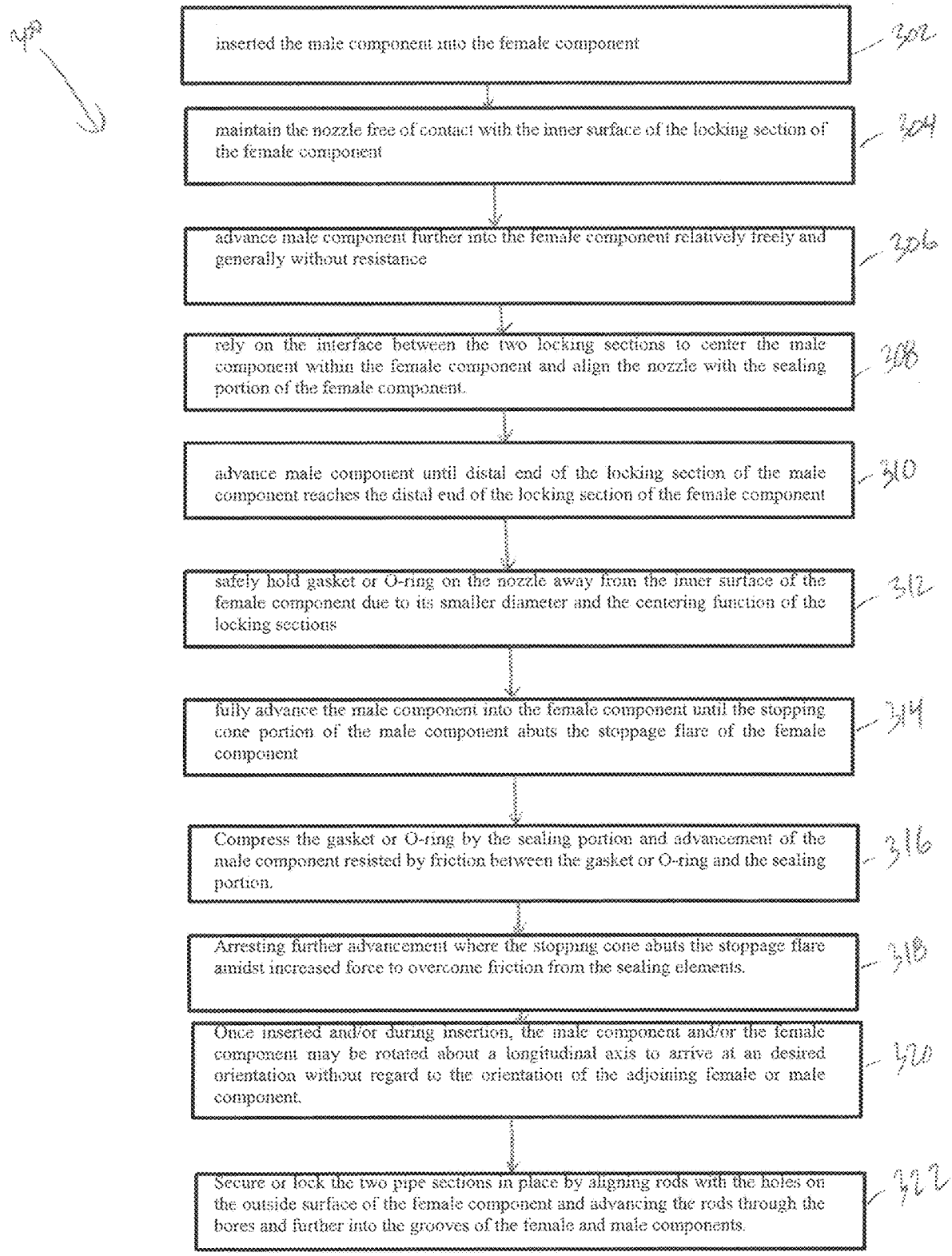
FIG. 8 is a flow chart of a method of connecting a pair of pipe segments.

Referring now to FIG. 7, another embodiment of a pipe connection 200 is shown. In this embodiment, several of the features of the embodiment described with respect to FIGS. 1-6 may remain. For example, the female component 202 may include a neck portion 210 and a sealing collar 212. However in the present embodiment, the stoppage flare 214 and the locking section 216 may be combined. As shown, the stoppage flare 214 may continue over a larger length and may include bores 238 and locking grooves 240 akin to the locking section 116 in the above-described embodiment. Similarly, the male component 204 may include a nozzle portion 242 and a taper portion 248. However, the stopping cone 244 and locking section 246 may be combined to correspond to the combined stoppage flare 214 and locking section 216 of the female component 202. Still other modifications of the embodiments described may be provided.

In use, the male component may be inserted into the female component to form a connection between two pipe sections (302). As can be appreciated from a review of FIG. 3, the nozzle may be inserted into the distal end of the female component and may be substantially free of contact with the inner surface of the locking section of the female component because of the relatively small diameter of the nozzle relative to the inner diameter of the locking section (304). The male component may be advanced further into the female component relatively freely and generally without resistance (306). When the distal end of the locking section of the male component reaches the distal end of the locking section of the female component (310), the interface between the two locking section may function to center the male component within the female component and align the nozzle with the sealing portion of the female component (308). As the male component is further advanced within the female component, gasket or O-ring on the nozzle may be safely held away from the inner surface of the female component due to its smaller diameter and the centering function of the locking sections (312). The male component may be advanced fully into the female component until the stopping cone portion of the male component abuts the stoppage flare of the female component (314). As this occurs, the nozzle of the male component may be advanced within the sealing portion of the female component. During this process, the gasket or O-ring may be compressed by the sealing portion and advancement of the male component may be resisted by friction between the gasket or O-ring and the sealing portion (316). However, the male component may be urged further into the female component until the stopping cone abuts the stoppage flare, which may arrest further advancement of the male component (318). As such, over advancement of the male component may be avoided amidst increased force to overcome friction from the sealing elements. Once inserted and/or during insertion, the male component and/or the female component may be rotated about a longitudinal axis to arrive at an desired orientation without regard to the orientation of the adjoining female or male component (320). That is, the two pipe sections may be arranged at any relative rotational angle about the longitudinal axis extending through the joint. The two pipe sections may be secured and/or locked in place by aligning rods with the holes on the outside surface of the female component, advancing the rods through the bores and further into the grooves of the female and male components (322). It is to be appreciated that the grooves on the inner surface of the female component and the grooves on the outside surface of the male component may function as an extension of the bores around the circumference of the locking section of the male component. The deformation bars that occurs as they are driven into the bores may create a friction fit of the bars allowing them to be substantially secure once driven.

The present connection may be highly advantageous for high-pressure pipe and/or composite pipe connections. The pipe diameters that this connection may be applicable to may include pipe diameters ranging from 2 inches to 96 inches or from 8 inches to 40 inches, or from 12 inches to 24 inches. Other diameter pipes including pipe diameters that are smaller than the listed pipe sizes or larger than the listed pipe sizes may be provided. Still further, fractional sizes rather than even integer sizes may also be provided. The connection may be suitable for pressures ranging up to and exceeding 200 bar. In one or more embodiments, the connection may be suitable for pressure ranges ranging from 10 bar to 300 bar or from 50 bar to 200 bar or 75 bar to 125 bar. The suitable pressure may be a function of the diameter of the pipe and, as such, higher pressures may be suitable for smaller diameter pipe and lower pressures may be suitable for larger diameter pipe.

In one or more embodiments, the presently disclosed pipe connection may be free of threading and as such, may not be subject to loosening when one of the pipe sections is rotated relative to the other. Moreover, limitations on unthreading may be avoided all together.

In the present application, the use of the terms distal and proximal should be considered relative to the main body of the pipe section. As such, a portion of the connection that is distal to another portion means that portion is closer to the end of the pipe section. Similarly, a portion of the connection that is proximal is closer to the pipe section itself. In light of this, when reviewing the discussion of the connection, a portion that is distal for the male component may correspond to portions that are relatively proximal for the female component.

Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A pipe, comprising:
    an elongated composite section having a lumen extending therethrough from a first end having a female component contiguous with and formed thereon to a second end having a male component contiguous with and formed thereon, wherein:
    the female component is configured for receiving an adjoining male component, the female component comprising:
        a cylindrical sealing portion configured for sealing engagement of a nozzle of the adjoining male component, the cylindrical sealing portion having a constant inner diameter forming a smooth sealing surface and having a first longitudinal length;
        a conical stoppage flare arranged distally from the sealing portion along the elongated composite section and configured for arresting further advancement of the adjoining male component into the female component; and
        a first locking section configured for securing the adjoining male component within the female component and comprising a bore extending therethrough to a first groove in alignment with the bore and configured to receive a portion of a locking rod; and
    the male component is configured for insertion into an adjoining female component, the male component comprising:
        a substantially cylindrically shaped nozzle having a circumferential groove adapted for receiving a seal and configured for sealing engagement with a sealing portion of an adjoining female component, the substantially cylindrically shaped nozzle having a second longitudinal length shorter than the first longitudinal length;
a stopping cone arranged proximally from the nozzle along the elongated composite section and configured for abutting engagement with a conical stoppage flare of the adjoining female component; and
a second locking section having a substantially constant outer diameter and configured for securing the male component in the adjoining female component and comprising a second groove having a location corresponding to the first groove to receive another portion of the locking rod, wherein, the male component is substantially contiguous and comprises a substantially constant inner diameter that is substantially the same as an inner diameter of the lumen.

2. The pipe of claim 1, wherein the inner diameter of the sealing portion is substantially similar to an outer diameter of the pipe.

3. The pipe of claim 1, wherein the stoppage flare comprises an inner surface of the female component with a first diameter near the sealing portion and a second diameter distal to the first diameter and wherein the second diameter is larger than the first diameter.

4. The pipe of claim 3, wherein the locking section comprises a plurality of holes on an outer surface thereof and leading to a plurality of bores that extend through the wall of the locking section to an inner surface thereof.

5. The pipe of claim 4, wherein the inner surface of the locking section comprises a plurality of grooves that align with the plurality of bores.

6. A pipe connection, comprising:
a male component contiguous with and formed on an end of a composite pipe having a lumen; and
a female component contiguous with and formed on an end of an adjoining composite pipe and configured for receiving the male component, the female component comprising:
 a cylindrical sealing portion configured for sealing engagement of a nozzle of the male component, the cylindrical sealing portion having a constant inner diameter forming a smooth sealing surface and having a first longitudinal length;
 a conical stoppage flare arranged distally from the cylindrical sealing portion and configured for arresting further advancement of the male component into the female component; and
 a first locking section configured for securing the male component within the female component and comprising a bore extending therethrough to a first groove in alignment with the bore and configured to receive a portion of a locking rod; and
the male component configured for securing the male component within the female component and comprising:
 a substantially cylindrically shaped nozzle having a circumferential groove adapted for receiving a gasket and configured for sealingly engaging the cylindrical sealing portion, the substantially cylindrically shaped nozzle having a second longitudinal length shorter than the first longitudinal length;
 a stopping cone arranged distally from the nozzle and configured for abutting engagement with the stoppage flare; and
 a second locking section having a substantially constant outer diameter and configured for securing the male component in the female component and comprising a second groove having a location corresponding to the first groove to receive another portion of the locking rod, wherein, the male component is substantially contiguous and comprises a substantially constant inner diameter that is substantially the same as an inner diameter of the lumen.

7. The pipe connection of claim 6, wherein nozzle has an outer diameter substantially smaller than an inner diameter of the first locking section.

8. The pipe connection of claim 6, wherein the stoppage flare comprises a cone-shaped lumen configured for abutting engagement with the stopping cone.

9. The pipe connection of claim 6, wherein the first locking section and the second locking section comprise grooves for receiving locking rods.

10. The pipe connection of claim 9, wherein abutting engagement of the conical stoppage flare with the stopping cone causes alignment of the grooves on the first locking section with the grooves on the second locking section.

11. The pipe connection of claim 10, wherein the first locking section comprises a plurality of bores extending from an outer surface to an inner surface and configured for receiving locking rods.

12. The pipe connection of claim 11, wherein each of the plurality of bores align with one of the grooves.

13. The pipe connection of claim 12, wherein the plurality of bores are arranged tangential to the inner surface of the first locking section.

* * * * *